United States Patent [19]

Jozefczak et al.

[11] Patent Number: 5,186,371

[45] Date of Patent: Feb. 16, 1993

[54] SPARE TIRE CARRIER

[75] Inventors: Thadius F. Jozefczak, Warren; Kent W. Madill, Rochester, both of Mich.

[73] Assignee: General Motors Corporation, Detroit, Mich.

[21] Appl. No.: 694,599

[22] Filed: May 2, 1991

[51] Int. Cl.$^5$ .............................................. B62D 43/02
[52] U.S. Cl. ................................ 224/42.21; 224/42.06; 414/463; 296/37.2
[58] Field of Search ................. 414/463–466; 296/37.2; 224/42.21, 42.24, 42.25, 42.06, 42.12, 42.13, 42.03 R, 42.03 A

[56] References Cited

U.S. PATENT DOCUMENTS

| | | | |
|---|---|---|---|
| 1,472,983 | 11/1923 | Lawrence | 224/42.21 X |
| 2,494,411 | 1/1950 | Simi | 414/465 |
| 2,574,465 | 11/1951 | Clark | 224/42.21 X |
| 2,635,795 | 4/1953 | White | 414/465 |
| 3,700,130 | 10/1972 | Holdread | 414/466 |
| 3,718,226 | 2/1973 | Penley | 414/466 X |
| 3,845,891 | 11/1974 | Becher | 224/42.21 |
| 4,140,255 | 2/1979 | Weiler | 224/42.06 |
| 4,264,260 | 4/1981 | Krakow | 414/465 |
| 4,282,994 | 8/1981 | Hilliard | 224/42.06 |
| 4,561,575 | 12/1985 | Jones | 224/42.21 |
| 4,971,237 | 11/1990 | Davis | 224/42.06 |

FOREIGN PATENT DOCUMENTS

| | | | |
|---|---|---|---|
| 0277730 | 8/1914 | Fed. Rep. of Germany | 224/42.21 |
| 0486676 | 11/1929 | Fed. Rep. of Germany | 224/42.13 |
| 0985828 | 7/1951 | France | 224/42.13 |
| 0265740 | 6/1970 | U.S.S.R. | 224/42.21 |

OTHER PUBLICATIONS

Lawrence Carrier Corp., The Lawrence Carrier, Jul. 1970, p. 4 only.

*Primary Examiner*—Henry J. Recla
*Assistant Examiner*—Casey Jacyna
*Attorney, Agent, or Firm*—Edward J. Biskup

[57] ABSTRACT

A spare tire carrier for a vehicle with a tailgate or other rear access assembly characterized in that the spare tire carrier is adapted to swing away outwardly from the vehicle and is provided with a swing-down device which allows a spare tire to be lowered into ground contact for easy removal of the spare tire. The swing-down device includes a tire support plate and an assist arm is pivotally coupled to the tire support plate for controlling the movement of the tire support plate when the latter is unlatched from the spare tire carrier.

3 Claims, 3 Drawing Sheets

SPARE TIRE CARRIER

BACKGROUND OF THE INVENTION

This invention relates generally to outside spare tire carriers and more specifically to an outside spare tire carrier which allows the spare tire carrier to swing away from the tailgate of a vehicle and afterwards allows the spare tire to be lowered to ground level to facilitate removal of the tire.

Spare tire carriers are often mounted on the rear of a "Tracker" type vehicle so the spare tire does not infringe upon the space available within the vehicle for carrying cargo and/or passengers. However, if the vehicle is equipped with a tailgate or some other type of rear closure assembly such as a door, a rear mounted tire carrier can interfere with the operation of the closure assembly.

To overcome this difficulty, spare tire carriers are at times mounted on a pivotable frame to allow the carrier to be swung away from the rear closure assembly. Such a device is disclosed in U.S. Pat. No. 4,817,834 issued to Raywood C. Weiler on Apr. 4, 1989. This patent discloses a rear bumper mounted spare tire carrier which is mounted on a side corner of the bumper by a first mounting bracket and is mounted to the tailgate by a second mounting bracket. An arm, rotatably mounted to the first mounting bracket, is pivotal between a position adjacent the tailgate and a position located outwardly from the vehicle. When the arm is spaced away from the vehicle, the tailgate may be opened or closed without interference from the spare tire carrier. A latching mechanism selectively latches the arm to the second mounting bracket on the tailgate when the latter is closed to secure the spare tire carrier during operation of the vehicle.

Another difficulty with spare tire carriers mounted on the rear of vehicle is the requirement for lifting the tire off of the tire carrier or having to lift the tire onto the tire carrier. U.S. Pat. No. 3,822,814 issued to Nick A. Baldi on Jul. 9, 1974 discloses a bumper mounted spare tire carrier which addresses this difficulty. In this case, the spare tire carrier comprises a mounting bracket bolted to a rear bumper of a vehicle and the tire is attached to a rigid arm pivotally mounted at one end the bracket. The arm extends beyond the attachment point of the tire and a handle is mounted at a distal end of the arm so that the tire can be lowered by grasping the handle, unlatching a latch and pivoting the arm and tire downwardly to the ground for easy removal of the tire.

Although the Baldi patent provides a tire carrier which allows operation of the rear closure assembly without interference and also permits the tire to swing downwardly to make mounting and removing the spare tire less burdensome, it is often desirable to be able to swing the spare tire to the ground for easy removal and also not be limited to having to swing the tire downwardly and afterwards upwardly every time one wishes to use the tailgate or other rear closure assembly. Accordingly, the present invention is directed to a spare tire carrier which alleviates this problem.

Other patents relating to tire carriers which facilitate removal of a spare tire are Jones U.S. Pat. No. 4,561,575 issued on Dec. 31, 1985, Salmon et al U.S. Pat. No. 4,850,518 issued on Jul. 15, 1984, and Franklin U.S. Pat. No. 2,063,598 issued on Dec. 8, 1936.

SUMMARY OF THE INVENTION

An object of the present invention is to provide a new and improved spare tire carrier that is adapted to swing from a latched position adjacent the rear portion of the vehicle to an open position wherein the carrier extends outwardly from the rear portion and allows the tire to swing downwardly for easy removal when the carrier is in the open position.

Another object of the present invention is to provide a new and improved spare tire carrier that is adapted to swing from a latched position adjacent the rear portion of the vehicle to an open position wherein the carrier extends outwardly from the rear portion and in which the carrier includes a swing-down device provided with an assist arm for supporting the tire for movement between a raised position and a lowered position.

Yet another object of the present invention is to provide a new and improved spare tire carrier that is adapted to swing from a latched position adjacent the rear portion of the vehicle to an open position wherein the carrier extends outwardly from the vehicle rear and in which the carrier has a swing-down device for supporting the tire for movement between a raised position and a lowered position including a pivotally connected assist arm for controlling the lowering movement of the tire.

The present invention meets the above mentioned objects by providing a spare tire carrier which includes a generally U-shaped tubular frame member pivotally connected to a rear corner of the vehicle and a swing down spare tire supporting device pivotally attached to the tubular frame member. A pair of hinge members are fixedly connected to a rear corner of the vehicle for supporting the open end of the U-shaped tubular frame member. A latching mechanism is mounted to the frame member for latching it to the vehicle while the closed end of the frame member is provided with the swing-down device which means supports the spare tire for movement between a raised position and a lowered position. More specifically, the swing-down device is pivotally attached to a support bracket fixedly mounted on the frame member and includes a pivot arm pivotally coupled to the support bracket and a tire support plate fixedly connected to the pivot arm for supporting the spare tire. The tire support plate is formed with a support plate latch for maintaining the tire in the raised position and an assist arm is pivotally coupled to the support plate for movement between a stowed position wherein the assist arm operatively engages the frame member and an extended position. To facilitate removal of the tire from the frame member, the assist arm is pivoted from the stowed position to the extended position so that the assist arm provides support for the swing-down device while the tire is being lowered. Afterwards, the support plate latch is unlatched and the assist arm is lowered causing the tire to pivot downwardly from the raised position under the control of the assist arm until the tire abuts the ground. The tire can then be removed easily from the lowered tire support plate, and later be replaced with similar ease onto the tire support plate. To return the spare tire to its normal stowed position, the assist arm is raised causing the swing-down device to be raised, from the lowered position to the raised position. The support plate latch is then latched to secure the tire in place on the frame member, and the assist arm is pivoted downwardly to the stowed position.

Other objects and features of the invention will become apparent to those skilled in the art from the following detailed description which sets forth the best mode of the invention contemplated by the inventor as illustrated in the accompanying sheets of drawing, in which:

DETAILED DESCRIPTION OF THE PREFERRED EMBODIMENT

Figure 1:
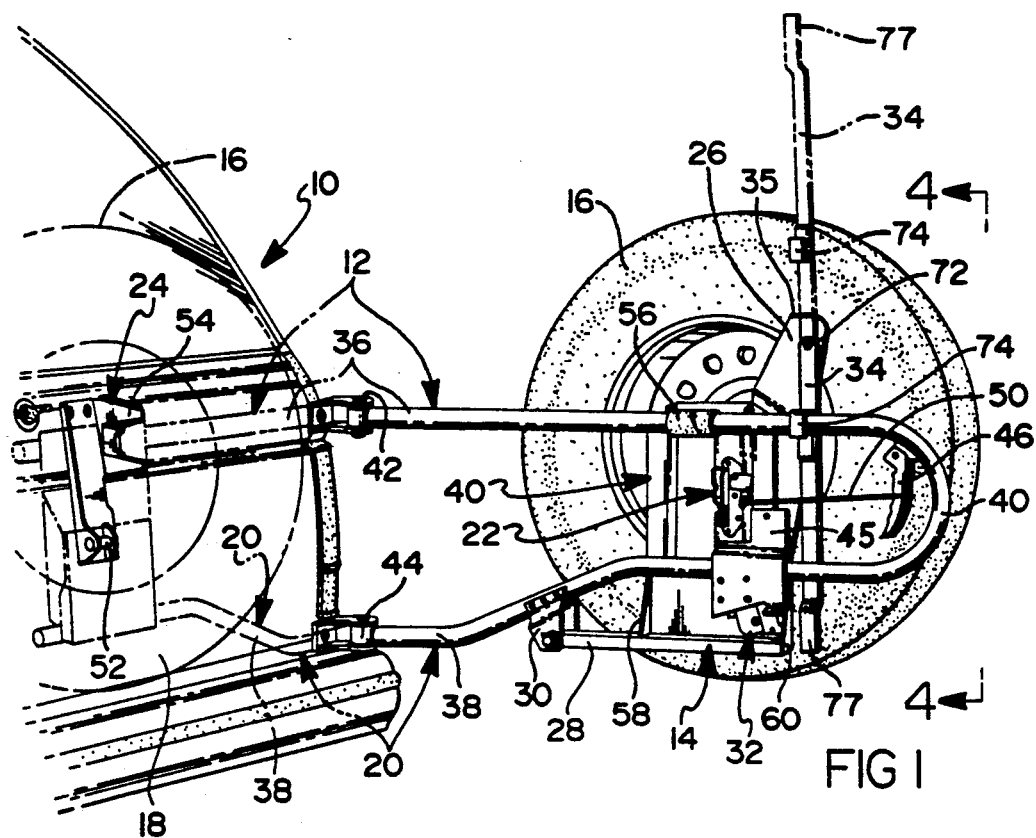
FIG. 1 is a perspective view of the rear end of a vehicle having a spare tire carrier including a swing-down device made according to the present invention and showing the spare tire carrier in the open position.

Referring now to the drawings, a vehicle 10 with a spare tire carrier 12 made according to the invention is shown in FIG. 1. As seen in full lines, the spare tire carrier 12 is located in the open position and includes a swing-down device 14 supporting a spare tire 16 which together with the swing-down device 14 is adapted to be latched to the tailgate 18 in a closed position as shown by the phantom lines. As should be apparent, wherever the tailgate 18 is to be opened, the spare tire carrier 12 is designed to swing from the closed or latched phantom line position wherein the spare tire carrier 12 is adjacent the tailgate 18, as shown in FIG. 1, outwardly to the open full line position to allow use of the tailgate 18. The spare tire carrier 12 is also designed to allow the tire 16 to swing from a raised position, as shown in FIG. 1, downward to a lowered position, as shown in FIG. 5, using the swing down-device 14 to the spare tire 16 and thereby allow it to be removed easily from the carrier 12.

The carrier 12, in general, comprises a tubular frame member 20 pivotally attached to a rear corner of the vehicle 10. A latching mechanism 22 is fixedly mounted to the frame member 20 for latching the carrier 12 to a latch receptacle 24 fixedly mounted on the tailgate 18 when the carrier 12 is in the latched position. The latching mechanism 22 can be released to allow the carrier 12 to swing outwardly to the open position to allow access to the tailgate 16.

Figure 5:
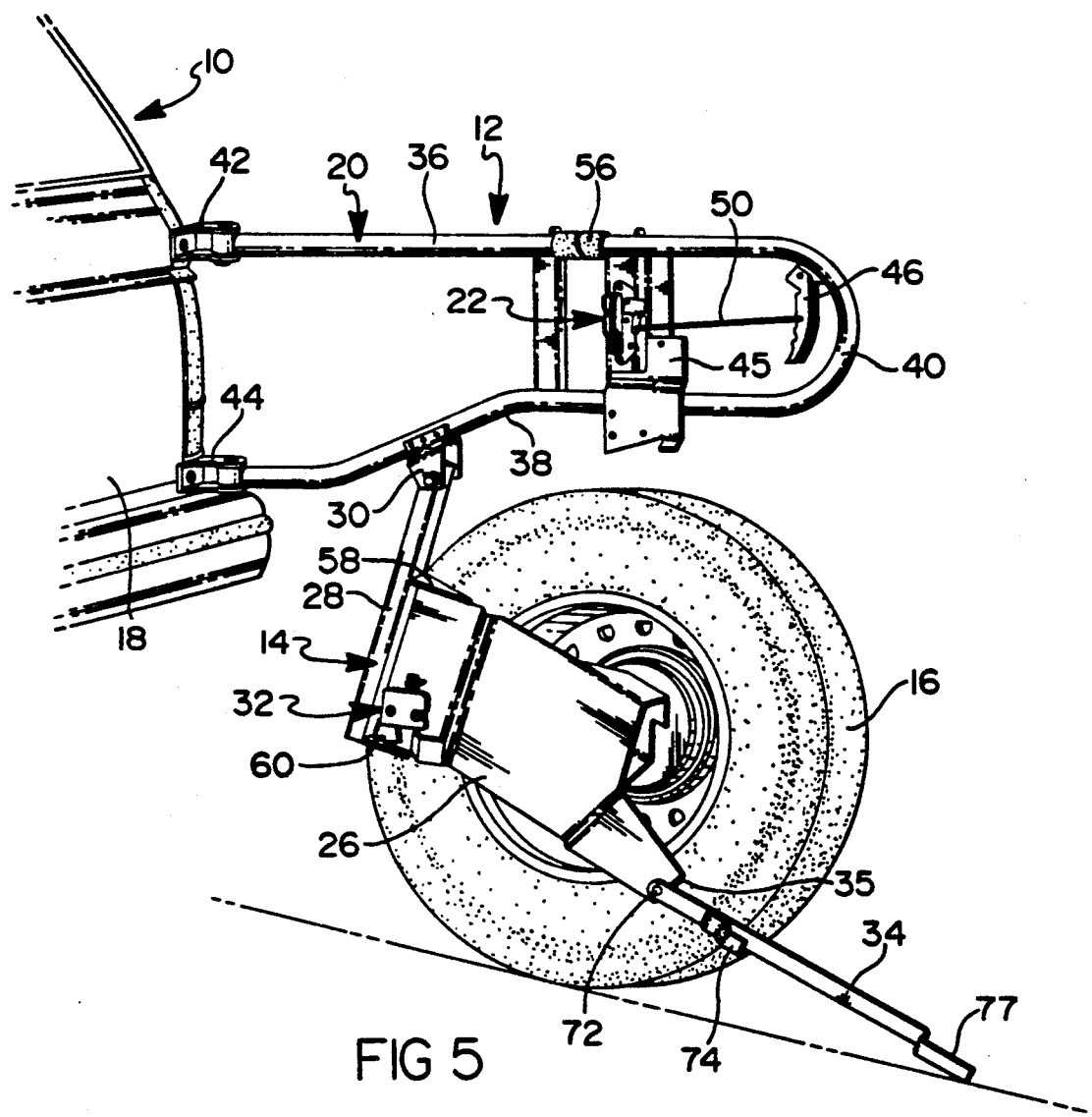
FIG. 5 is a view similar to that seen in FIG. 1 of the spare tire carrier showing the swing-down device in the lowered position.

The swing-down device 14 includes a tire support plate 26 fixed to an arm 28 which, in turn, is pivotally mounted to the frame member 20 by a bracket 30 for pivotable movement between the raised position of FIG. 1 and the lowered position of FIG. 5. The support plate 26 supports the tire 16 and has a support plate latch 32 for maintaining the tire 16 in the raised position and an assist arm 34 pivotal between a stowed position, as shown in full lines in FIG. 1, and an open position, as shown in phantom lines, for providing support for the tire 16 when it is being lowered. To lower the tire 16, the arm 34 is pivoted from the full line stowed position (both seen in FIG. 1) to the phantom line open position and is maintained in the open position by engaging a stop member 35 formed with the support plate 26. The latch 32 is then unlatched and the tire 16 is lowered using the arm 34 of the swing-down device 14 until the tire 16 contacts the ground and can be easily removed from the support plate 30. The tire 16 can also be returned to the support plate 26 and lifted by using the arm 34 of the swing-down device 14 to the raised position as will be more fully explained hereinafter.

More specifically, the frame member 20 is generally U-shaped and has a top arm 36 and a bottom arm 38 interconnected by a curved portion 40, as shown in FIG. 1. The frame member 20 is pivotally mounted to the rear corner of the vehicle 10 by a pair of vertically spaced hinge members 42 and 44. The latching mechanism 22 is mounted on a plate 45 fixed with the frame member 20 between the arms 36 and 38 to latch the carrier 12 to the latch receptacle 24 on the tailgate 18 and has a release handle 46 attached to a rod 50 for manually unlatching the carrier 12 from the tailgate 18. The latch receptacle 24 includes a striker bar 52 and a guide member 54. A damper 56 made of a rubber-like material is mounted on the top arm 36 of the tubular frame member 20 and is adapted to fit into the guide member 54 when the carrier 12 is in the latched closed position. The damper 56 serves to prevent any vibrations from being transferred from the carrier 12 to the vehicle 10 when the carrier 12 is in the latched position and the vehicle 10 is traveling along a road and the latching mechanism 22 is latched to the striker bar 52. As alluded to, the latching mechanism 22 can be released to allow the carrier 12 to move to the open position by manually squeezing the handle 46 so as to cause the rod 50 to disengage the latching mechanism 22 from the striker bar 52. When the carrier 12 is in the open position, the tailgate 12 is accessible for use. The preceding described latching arrangement for latching the frame member 20 to the tailgate 18 is well known in the art and is presently in use on GENERAL MOTORS S-15 JIMMYs and CHEVROLET S-10 BLAZERs.

As mentioned above, the swing-down device 14 allows the tire 16 to be pivoted down from the raised position shown in FIG. 1 to the lowered position, as shown in FIG. 5, for easy removal of the tire 16. As can best be seen in FIG. 5 the swing-down device 14 is pivotally coupled to the bracket 30 which is fixedly mounted to the arm 38 of the frame member 20. The arm 28 is made of a hollow box section and the support plate 26 is fixedly connected to the arm 28 and is laterally stabilized by a pair of triangular supports 58 and 60 fixedly attached to both the support plate 26 and the pivot arm 28. The tire 16 is removably mounted on the usual threaded studs (not shown) fixed to the support plate 26. As should be apparent, the support plate 26 together with arm 28 are pivotable with the tire 16 between the latched position and the lowered position of the swing-down device 14.

Figure 2:
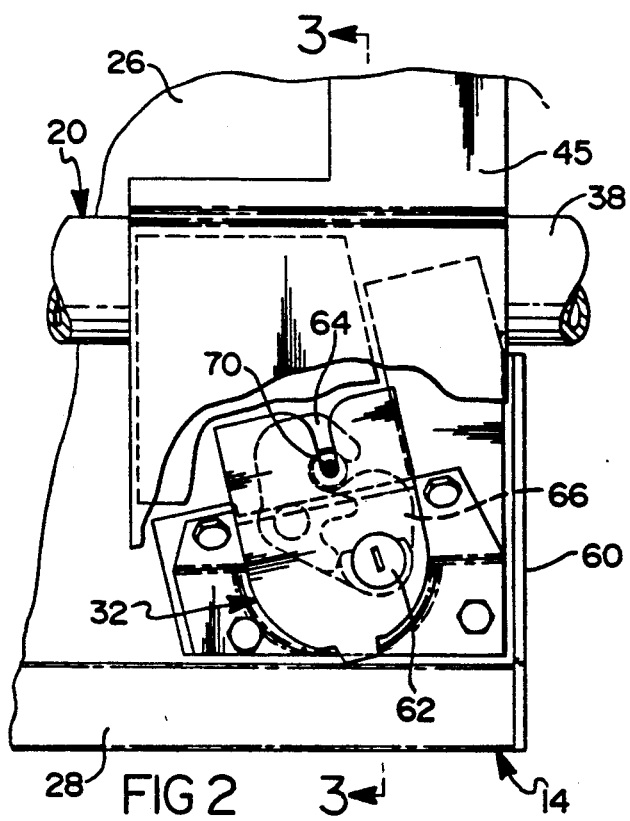
FIG. 2 is an enlarged elevational view of the support plate latch incorporated with the swing-down device of the spare tire carrier of FIG. 1.
Figure 3:
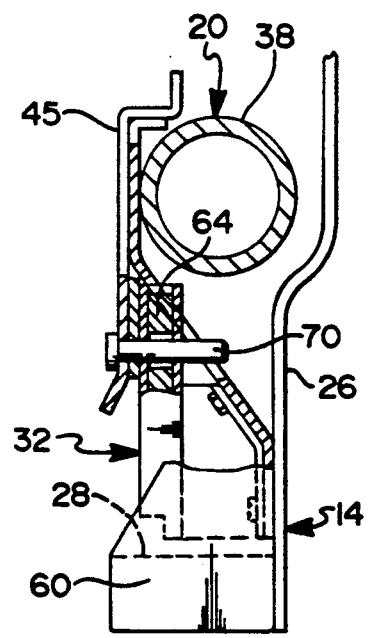
FIG. 3 is an end view of the support plate latch taken along line 3—3 of FIG. 2.
Figure 4:
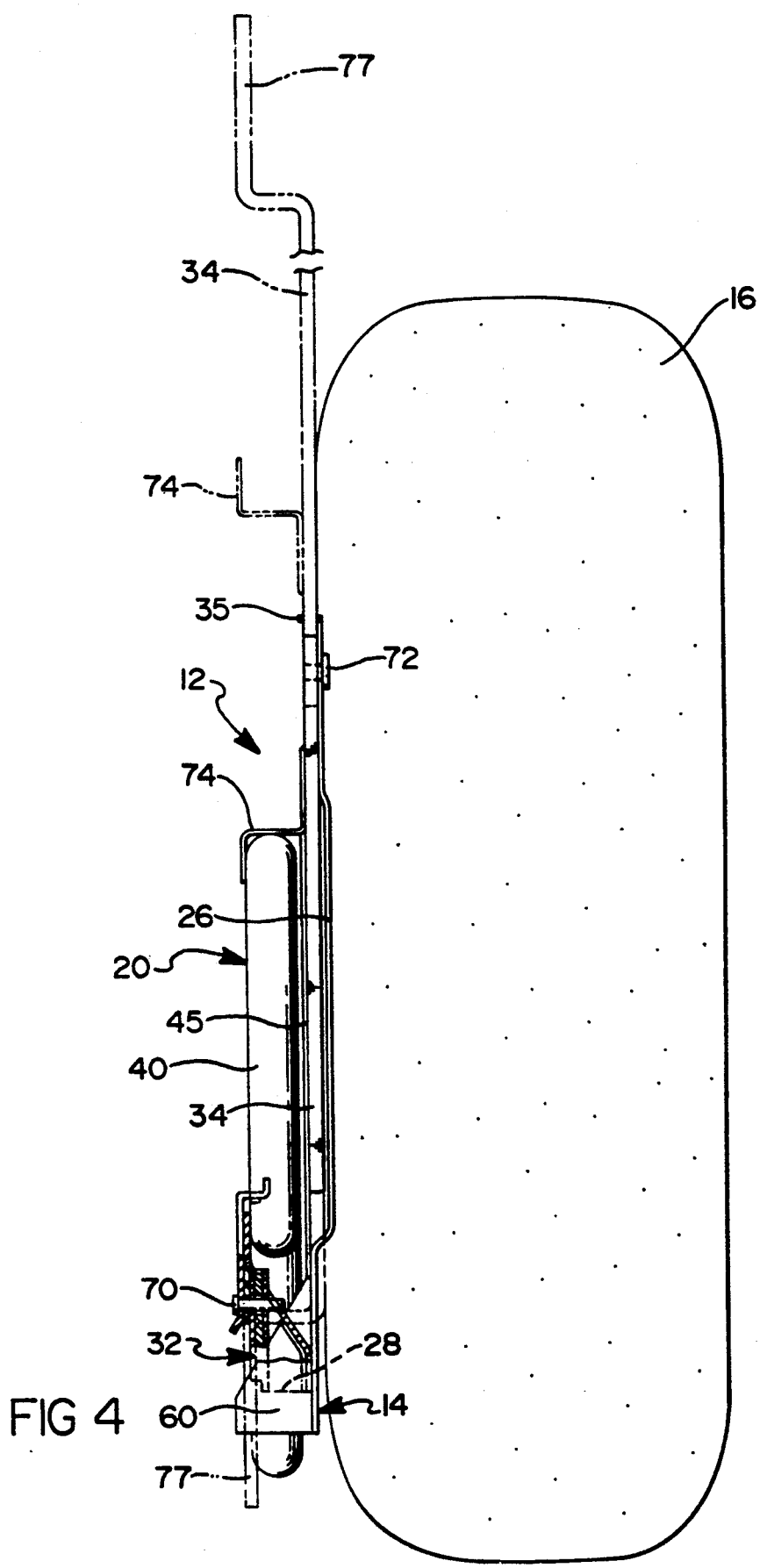
FIG. 4 is an enlarged end view of the spare tire carrier taken in line 4—4 of FIG. 1.

The latch 32 is fixedly attached to the support plate 26, as best shown in FIGS. 2 and 3. The latch 32 is similar to a typical trunk lid latch, an excellent example of which can be seen in U.S. Pat. No. 4,054,309 issued to Hans J. Borlinghaus on Oct. 18, 1977, the disclosure of which is hereby incorporated by reference. The latch 32 includes a key cylinder 62, a fork type bolt 64, and a cam assembly 66. As described in the Borlinghaus patent, rotation of the key cylinder 62 will rotate the cam assembly 66. The bolt 64 is biased in an unlatched position but is maintained in a latched position by engaging the cam assembly 66. Rotation of the cam assembly 66 allows the latch bolt 64 to move out of the latched position.

The plate 45 fixed to the frame member 20 is formed with a striker 70 which cooperates with the latch 32 for connecting the tire support plate 26 to the base plate 45 when the spare tire 16 is in the latched position. Thus, when a key rotates the key cylinder 62, the cam assembly 66 is rotated and the bolt 64 is allowed to move out of the latched position, as mentioned above. This allows the support plate latch 32 to be released from the striker 70 and unlatched from the base plate 45.

As seen in FIG. 5, the stop member 35 for the assist arm 34 is integrally formed and fixed with the tire support plate 26. The assist arm 34 is connected at one end by a pivotal connection 72 to tire support plate 26 and has a base tab 74 secured thereto and projecting outwardly therefrom and has a handle 77 at its free end. As mentioned above, the assist arm 34 is pivotable between a stowed position and an open position, as shown in FIG. 1. When the assist arm 34 is in the stowed position, as shown in full lines, the base tab 74 engages the top arm 36 of the frame member 20. The base tab 74 serves to keep the assist arm 34 in the stowed position by exerting a clamping force on the top arm 36 of the frame member 20. In addition, when the assist arm 34 is in the stowed position, the base tab 74, cooperating with the assist arm 34 and the support plate 26, can help to support the weight of the spare tire 18 and thereby assist the latch 32 in retaining the tire 18 in the raised position.

During normal operation of the vehicle 10, the carrier 12 is latched to the tailgate 16, as shown in phantom lines in FIG. 1. As mentioned above, the carrier 12 may be unlatched from the tailgate 16 by use of the handle 46 and swung to the open position so that access can be gained to the tailgate 16. The swwing-down device 14 is normally in the raised position during operation of the tailgate 18, but may be pivoted to the lowered position for easy removal of the tire 16. In this regard, the swing-down device 14 can be moved to the lowered position by first moving the assist arm 34 from the stowed position to the open position seen in phantom lines in FIG. 1. This is accomplished by grasping the handle 77, as seen in FIG. 1, and moving the arm 34 counter-clockwise approximately 180 degrees until it abuts the stop member 35 which prevents the arm 34 from pivoting past the open position shown. While holding the arm 34 by the handle 77 in the open position the latch 32 is unlocked, followed by a lowering of the the swing-down device 14. Since the location of the handle 77 when the arm 34 is in the open position has a longer moment arm from the bracket 26 than it has from the center of the tire 16, the arm 34 acts as a lever to reduce the amount of force a person needs to use to lower the tire 16. Thus, the tire 16 swings down under the control of the arm 34 until the tire 18 abuts an engaging surface such as the ground, as shown in FIG. 5. When the tire 16 contacts the ground, the swing-down device 14 and the tire 16 are in the lowered position and the tire 16 may be removed easily from the swing-down device 14 by removing the nuts from the threaded studs and lifting the tire 18 off of the support plate 26.

Obviously, the above procedure is reversed when the tire 16 is to be mounted on the swing-down device 14 with the latter located in the position shown in FIG. 5. In other words, the tire 16 is mounted on the support plate 26 and is secured in place by threading the nuts on the studs. The arm 34, while abutting the stop member 72 in the open position, is then raised causing a raising of the support plate 26 and the tire 16 until the latch 32 engages the striker 70 of the base plate 45. The latch 32 latches automatically when it engages the striker 70 in the manner of a trunk lid latch and acts to maintain the tire 16 and the swing-down device 14 in the raised position. The arm 34 is then pivoted clockwise to the stowed position and is held in place by the base tab 76 engaging the frame member 20, as seen in FIG. 1.

I wish it to be understood that I do not desire to be limited to the exact details of the construction shown and described, for obvious modifications will occur to a person skilled in the art.

The embodiments of the invention in which an exclusive property or privilege is claimed are defined as follows:

1. A spare tire carrier for a vehicle, the spare tire carrier adapted to swing from a latched position wherein the carrier is located adjacent to a rear closure member of the vehicle to an open position wherein the carrier extends outwardly from the rear portion, the spare tire carrier comprising:
   a generally U-shaped tubular frame member pivotally attached to the vehicle by a pair of hinge members located to one side of the closure member;
   a first latching mechanism for latching the frame member to the closure member when the former is in the latched position;
   a bracket fixedly connected to the frame member;
   a swing-down device having a pivot arm pivotally attached to the bracket and supporting a spare tire for movement between a raised position wherein the spare tire is located above the ground and a lowered position wherein the spare tire contacts the ground;
   a tire support plate fixedly connected to the pivot arm for mounting the spare tire;
   the tire support plate having a second latching mechanism for maintaining the spare tire in the raised position relative to the frame member;
   an assist arm pivotally coupled to the tire support plate for movement between a stowed position and an open position;
   the assist arm having means engaging the tubular frame member when in the stowed position;
   the support plate having stop means for preventing the assist arm from pivoting past a predetermined point;
   the second latching mechanism serving to unlatch the support plate from the frame member to allow the spare tire to swing-downward from the raised position under the control of the assist arm when in the open position so that the tire can abut the ground and can be removed from the tire support plate.

2. A spare tire carrier for a vehicle, the spare tire carrier adapted to move from a latched position wherein the carrier is located adjacent a rear portion of the vehicle to an open position wherein the carrier extends outwardly from the rear portion, the spare tire carrier comprising:
   a frame member;
   a hinge means pivotally connecting the frame member to a rear corner of the vehicle so as to pivot about a vertical axis when moving the carrier between the latched position and the open position;
   a bracket fixedly connected to the frame member;
   a swing-down device pivotally attached to the bracket and supporting a spare tire for movement between a raised position wherein the spare tire is located above the ground and a lowered position wherein the spare tire contacts the ground;

the swing-down device having a pivot arm pivotally attached to the bracket so as to pivot about a horizontal axis when moving the spare tire between the raised position and the lowered position;

the swing-down device having a tire support plate fixedly connected to the pivot arm for removably mounting the spare tire;

a first latching mechanism carried by the tire support plate for maintaining the spare tire in the raised position;

an extendible assist arm pivotally connected to the tire support plate and extending outwardly beyond the circumference of the spare tire for moving and controlling the movement of the spare tire from the raised position to the lowered position so as to facilitate removal of the spare tire;

the extendible assist arm being pivotally movable between a stowed position and an open position; and the extendible assist arm engaging the frame member when in the stowed position.

3. A spare tire carrier for a vehicle, the spare tire carrier adapted to move from a latched position wherein the carrier is located adjacent a rear portion of the vehicle to an open position wherein the carrier extends outwardly from the rear portion, the spare tire carrier comprising:

a frame member;

a hinge means pivotally connecting the frame member to a rear corner of the vehicle so as to pivot about a vertical axis when moving the carrier between the latched position and the open position;

a bracket fixedly connected to the frame member;

a swing-down device pivotally attached to the bracket and supporting a spare tire for movement between a raised position wherein the spare tire is located above the ground and a lowered position wherein the spare tire contacts the ground;

the swing-down device having a pivot arm pivotally attached to the bracket so as to pivot about a horizontal axis when moving the spare tire between the raised position and the lowered position;

the swing-down device having a tire support plate fixedly connected to the pivot arm for removably mounting the spare tire;

a first latching mechanism carried by the tire support plate for maintaining the spare tire in the raised position;

an extendible assist arm pivotally connected to said tire support plate and extending outwardly beyond the circumference of the spare tire for moving and controlling the movement of the spare tire from the raised position to the lowered position so as to facilitate removal of the spare tire;

the extendible assist arm being pivotally movable between a stowed position and an open position;

the extendible assist arm being secured in the stowed position through a tab on the assist arm that operatively engages the frame member;

said support plate having stop means for preventing the assist arm from pivoting beyond a predetermined position; and said first latching mechanism serving to unlatch the support plate to allow the spare tire to swing-downward from the raised position under the control of the assist arm until the spare tire abuts the ground and is in the lowered position.

* * * * *